INVENTORS
RICHARD P. SCHOLFIELD
BORIS T. SMIRNOFF
BY Cushman, Darby & Cushman
ATTORNEYS

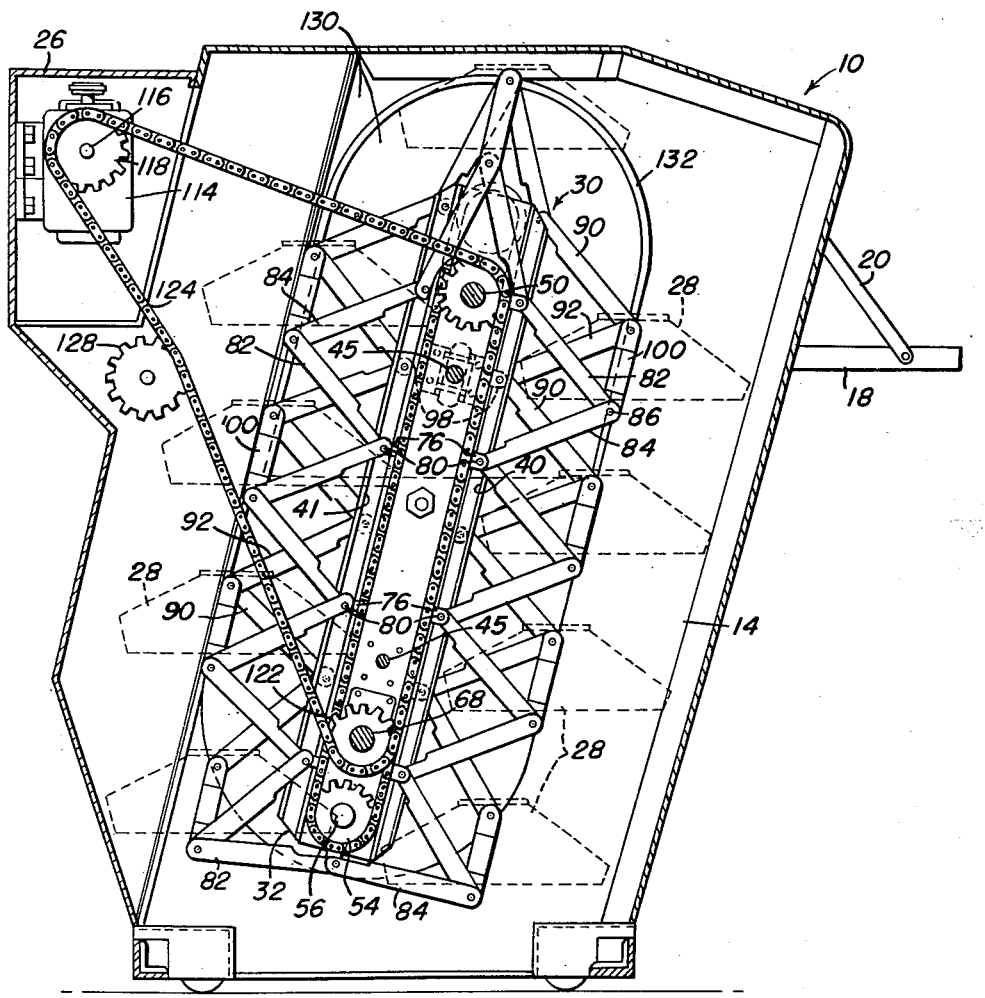
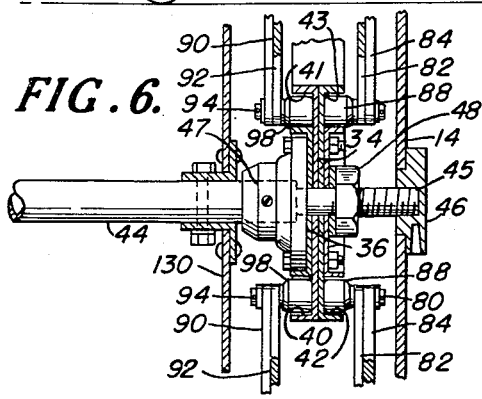

INVENTORS
RICHARD P. SCHOLFIELD
BORIS T. SMIRNOFF

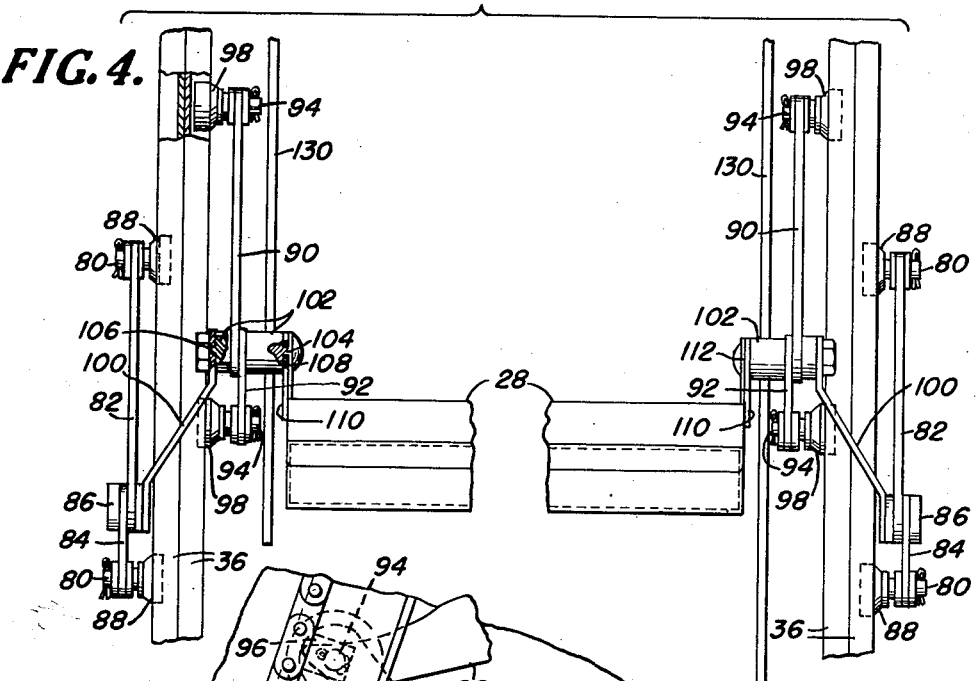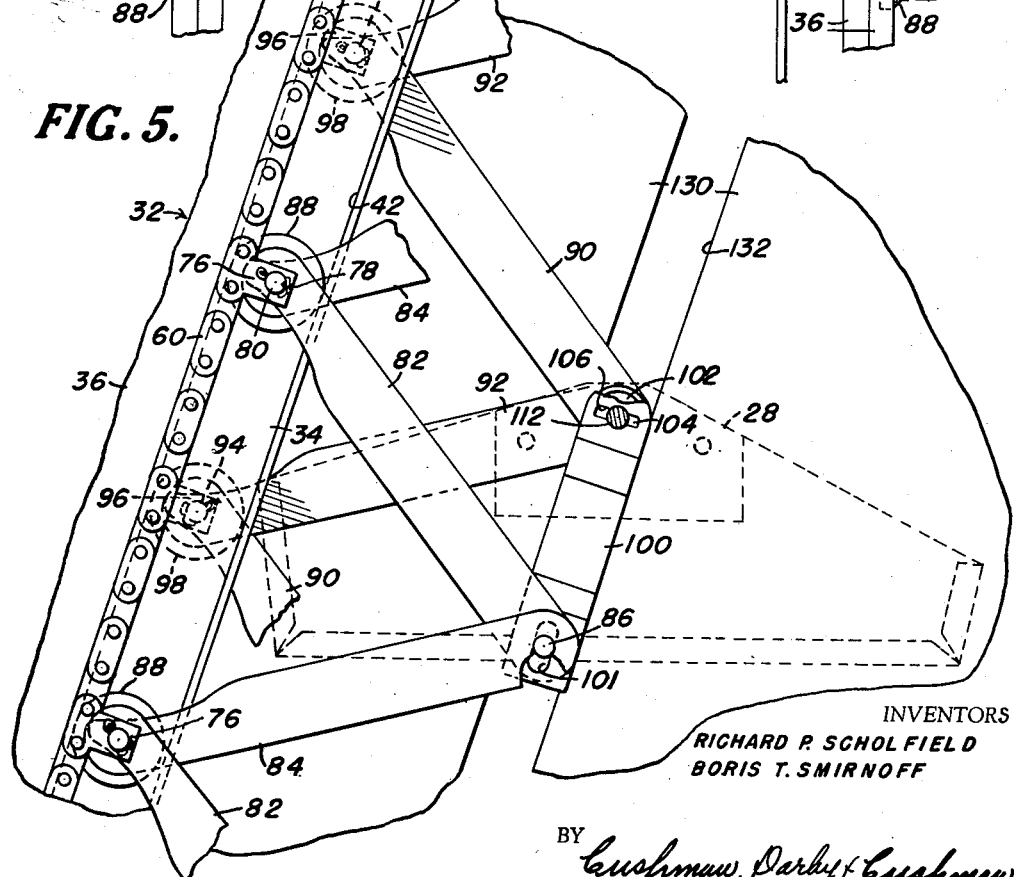

United States Patent Office 2,813,770
Patented Nov. 19, 1957

2,813,770

FILING APPARATUS

Richard P. Scholfield and Boris T. Smirnoff, White Plains, N. Y., assignors to Wheeldex Manufacturing Co., Inc., White Plains, N. Y., a corporation of New York Application January 7, 1955, Serial No. 480,443

5 Claims. (Cl. 312—268)

This invention relates to apparatus for storing materials and more particularly to the provision of means for bringing the stored material to a position of access by an operator to facilitate removing the material, placing the material in position for storage, or otherwise operating or manipulating the material and constitutes an improvement of the commonly assigned copending application Serial No. 243,821, filed August 27, 1951, by Richard P. Scholfield and Henry Gifford.

In the above mentioned application, there is disclosed a filing apparatus of the type in which a great plurality of cards or other documents to be filed are mounted in a plurality of trays movable in a non-circular path. The apparatus includes operating means whereby each of the trays may be moved into a position of access by an operator so that the cards may be examined, removed, inserted, entries posted thereon, and the like.

While the apparatus of the prior application proved satisfactory in operation, there were certain disadvantages which are largely overcome by the apparatus of the present invention. For example, the roller and guide track stabilizing arrangement of the prior apparatus rendered the apparatus rather noisy in operation, rendered assembly and disassembly difficult and otherwise contributed to making the apparatus more costly to produce and effectively maintain in working order.

Accordingly, it is an object of the present invention to provide an apparatus of the type described having an improved means for supporting the trays for movement along their path of travel which is simple in construction and quiet in operation.

A further object of the invention is the provision of an apparatus of the type described having improved means for maintaining the trays in a stabilized condition during their translational movement along their path of travel.

A still further object of the present invention is the provision of an improved means for supporting and stabilizing the trays for movement along their path of travel which comprises a compact mechanism arranged at each end of the trays operable at all times to effectively maintain the trays in a constant relation to the horizontal.

A still further object of the present invention is the provision of an apparatus of the type described having improved tray supporting means which is economical to manufacture, simple in operation and easy to maintain in operating condition.

These and other objects of the present invention will be apparent from a consideration of the following detailed description of an illustrative embodiment of the invention, shown in the accompanying drawings wherein:

Figure 2 is a vertical cross sectional view taken along the line 2—2 of Figure 1;

Figure 4 is an enlarged view similar to Figure 3 illustrating certain of the parts in greater detail;

Figure 5 is a fragmentary side elevational view of the structure illustrated in Figure 4;

Figure 6 is a cross sectional view taken along the line 6—6 of Figure 3; and

Figure 1:
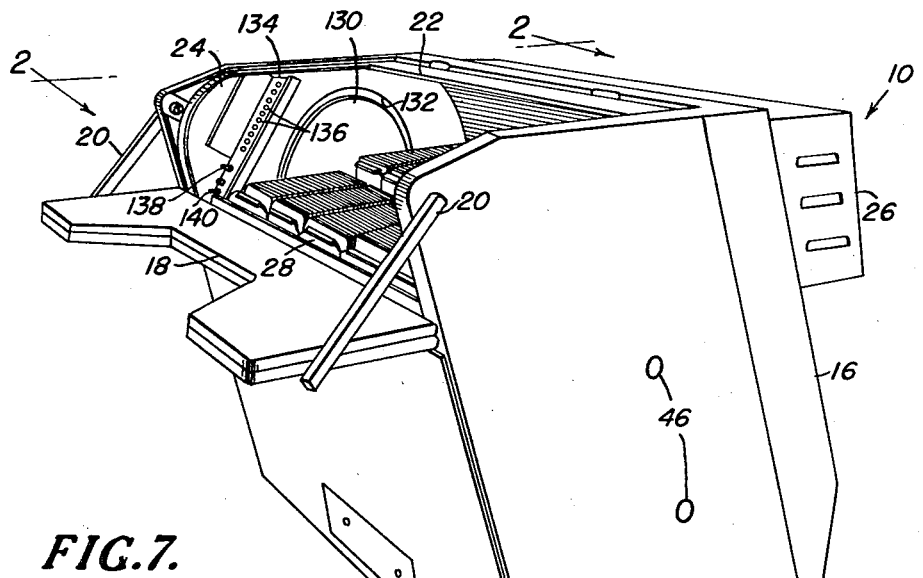
Figure 1 is a perspective view showing an apparatus embodying the principles of the present invention.

Referring now more particularly to the drawings, there is shown in Figure 1, an apparatus embodying the principles of the present invention which comprises a cabinet, generally indicated at 10, having an upwardly and forwardly inclined front wall 12, left and right hand side walls 14 and a rear wall 16. The front wall 12 preferably terminates below the upper forward edge of the cabinet to provide an access opening, and a pivotally mounted shelf 18 extends outwardly thereof to serve as a working surface for the operator. A pair of detachable braces 20 may be disposed between the outer ends of each side of the shelf and to the forward upper corners of the side walls 14 so as to maintain the shelf in working position. The upper forward portion and top of the cabinet may be closed by means of a flexible closure 22, slidably mounted on suitable tracks 24 adjacent each sidewall 14. Mounted on the upper rearward portion of the rear wall 16 is a housing 26 for a purpose hereinafter to be more fully described.

It will be understood that the walls 12, 14 and 16 may be braced and secured together in any suitable manner so as to form a unitary structure capable of housing and supporting a plurality of filing trays 28 arranged to carry a great plurality of filing cards or other objects.

Figure 3:
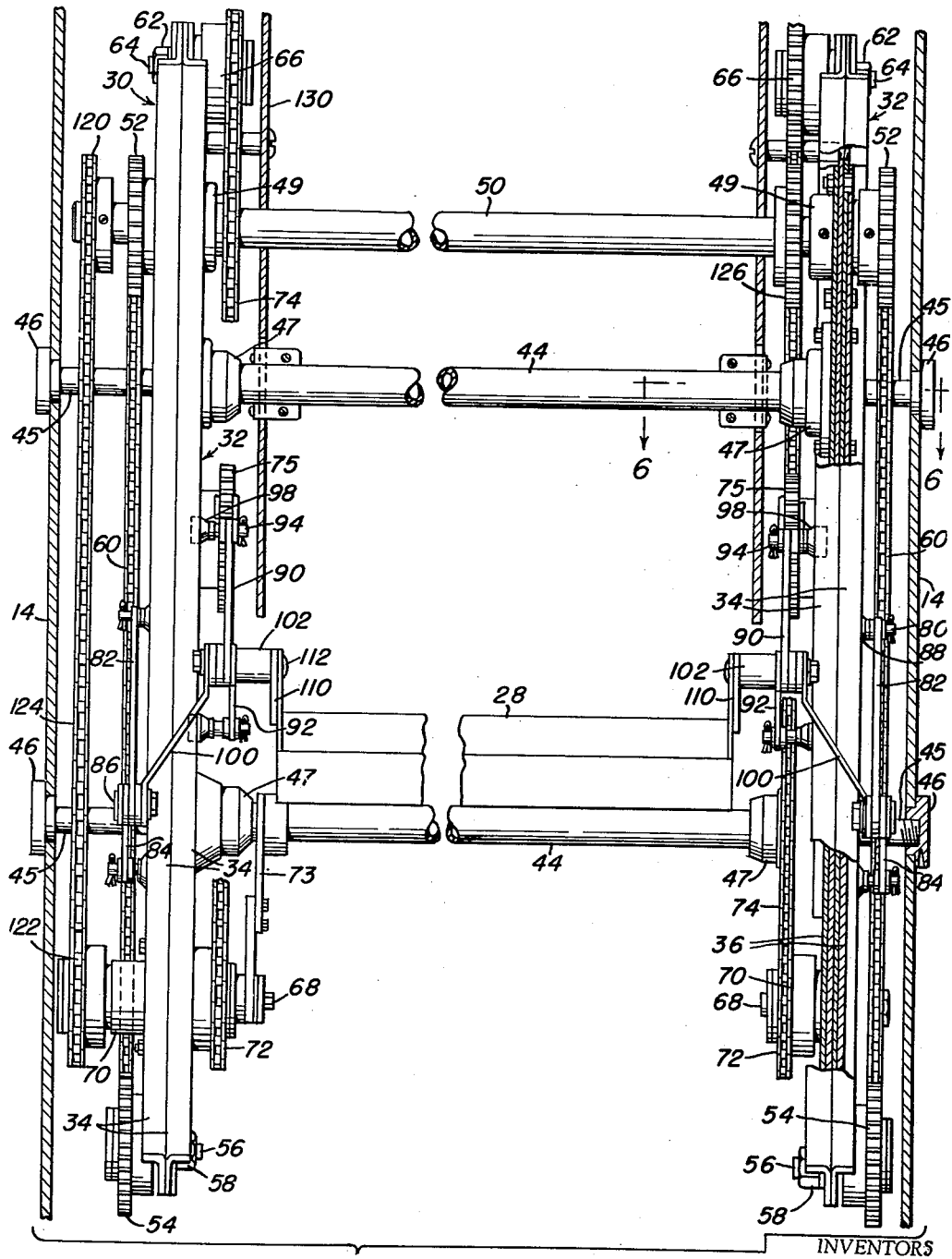
Figure 3 is a fragmentary elevational view showing the internal structure of the apparatus with all but one of the trays and associated structure removed and with certain parts broken away so as to more clearly illustrate the parts.

The present invention is more particularly concerned with a means, generally indicated at 30, for supporting the trays 28 within the cabinet for movement along a non-circular path having rounded upper and lower ends and straight intermediate runs. As shown in Figure 3, the means 30 preferably comprise a pair of support members 32 suitably mounted within the cabinet adjacent the side walls 14. The support members 32 may be constructed in any desired manner, a preferred construction being shown wherein two wide channels 34 are welded in back to back relation so that their channels face in opposite directions. Within each of the wide channels 34, a narrow channel 36 is secured with the flanges thereof being spaced inwardly from the respective flanges of the associated channel 34. With this construction, each support member 32 provides between the flanges thereof four straight, spaced parallel guide tracks 40, 41, 42 and 43.

As can best be seen in Figures 3 and 6, the support members 32 are fixedly secured within the cabinet in spaced relationship to each other by means of a pair of vertically spaced longitudinally extending tubes 44. A bolt 45 is rigidly secured to each end of the tubes 44 and extends outwardly through the adjacent portion of the support. The outer end of each bolt 45 has a flanged nut element 46 threaded thereon which engages within a suitable aperture formed in the adjacent side wall of the cabinet. The tubes 44 are secured to the support members by means of flanged couplers 48 fastened to the tubes adjacent their ends and by nuts 47 threaded on bolts 45.

Journalled within the upper end portion of each support member 32 by suitable bearings 49 is a longitudinally extending drive shaft 50 having a pair of longitudinally spaced sprockets 52 fixedly mounted thereon and disposed outwardly of each support member 32. Disposed on the lower end of each support member 32, is an aligned lower sprocket 54 journalled on a short stub shaft 56, fixedly secured to the support as by nuts 58. A chain 60 is trained around each pair of aligned sprockets 52 and 54.

The upper end of each support member 32 has mounted therein, as by nuts 62, a stationary stub shaft 64 upon which is journalled a sprocket 66 disposed on the inner side of the associated support member. Each shaft 64 is maintained in vertical spaced relation with respect to the associated shaft 50. Disposed above each shaft 56 a distance equal to the spacing between shafts 50 and 64 on each support member 32 is a stub shaft 68 journalled, as by bearings 70, within the support member and fixedly carrying a sprocket 72 adjacent the inner side of each support member. If desired, the left hand stub shaft 68 may have its inner end supported by suitable bracing 73 from the lower tube 44. An endless chain 74 is trained about each of the aligned upper and lower sprockets 66 and 72. If desired, intermediate idler sprockets 75 may be provided for each chain 74.

Referring now to Figures 4 and 5, each chain 60 has a plurality of spaced lugs 76 extending outwardly from equally spaced links throughout the chain. Each of the lugs 76 has an aperture 78 provided therein for receiving a pivot pin 80 upon which the inner ends of a pair of arms 82 and 84 are mounted. As shown in Figure 2, each pair of arms 82 and 84 diverge outwardly from the associated pivot pin 80 and the outer end of each arm 82 is pivotally interconnected as by pivot pin 86 with the arm 84 extending from the adjacent pivot pin 80. In this manner, there is provided a plurality of pairs of outwardly extending arms pivotally connected in spaced relation at their inner ends to the chain, and interconnected at their outer ends to provide pivotal axes disposed in the path of movement of the trays. In order to guide the inner ends of the links 82 and 84, and to prevent lateral movement of the same and the chain 60 during the intermediate straight runs of the latter, a roller 88 is journalled on each of the pins 80 and disposed to ride within the outwardly facing guide tracks 42 and 43.

Each of the inner chains 74 is correspondingly provided with a plurality of pairs of arms 90 and 92 having their inner ends pivotally mounted in spaced relation with the chains, as by pivot pins 94 and lugs 96, and their outer ends interconnected in a manner hereinafter to be described. The pivot pins 94 may have rollers 98 journalled thereon which are adapted to ride within the inwardly facing guide tracks 40 and 41.

Extending between each of the interconnected outer ends of the arms 82 and 84 and the corresponding interconnected outer ends of the arms 90 and 92 is a stabilizing link 100 having its lower end pivotally connected with the pivot pin 86 and its upper end fixedly secured to one end of a hollow stub shaft 102 which also interconnects the outer ends of arms 90 and 92. The lower end of each link 100 is provided with a longitudinally extending elongated slot 101 for receiving the associated pin 86. The slots 101 permit a slight rectilinear relative movement between the links 100 and pins 86 so as to insure a smooth movement of the trays around the curved ends under heavy load conditions. It will be noted that the distance between the pivot points of the shaft 102 and pin 86 on each link 100 is normally equal to the distance between the axes of shafts 50 and 64. As shown in Figure 4, each hollow stub shaft 102 may have transversely disposed lugs 104 projecting longitudinally from the end faces thereof which engage respectively within registering transversely extending, non-circular apertures 106 formed in the upper end of each of the links 100 and similar registering apertures 108 formed in a plate 110 rigidly secured to one end of each of the trays 28. A bolt 112 extending within each hollow stub shaft holds the lugs in their respective registering apertures.

Disposed within the housing 26 is an electric motor and speed reducer 114 having a drive shaft 116 extending outwardly therefrom which carries a main driving sprocket 118. Auxiliary drive sprockets 120 and 122 are mounted on extensions of the shafts 50 and 68 respectively, adjacent the left hand side of the cabinet, and a main driving chain 124 is trained about sprockets 118, 120, 122 so as to drive the outer chains 60 and the left hand inner chain 74. The right hand inner chain 74, is preferably driven by a sprocket 126 mounted on the shaft 50. If desired, an idler sprocket 128 may be mounted so as to engage with the main driving chain 124 and apply an operating tension thereto.

As shown in Figures 1 and 2, suitable guard plates 130 may be mounted adjacent each side of the cabinet so as to enclose the tray supporting means 30 and to hide the same from view. The guard plates are disposed in a plane intersecting the inner ends of the stub shafts 102, and are preferably mounted and related with respect to each other so as to provide a slot 132 within which the stub shafts 102 pass during their movement.

The present invention further contemplates the utilization of a push button electrical control system for actuating the motor 114 which may be of any well-known construction. Shown in Figure 1, is a control panel 134 having a series of push buttons 136, a manual control switch 138 and a master control switch 140. The master control switch 140 may be arranged, as is well-known in the art, to shut off the operation of the device to permit the device to be operated by means of the push buttons 136, or to permit the device to be operated under the control of the manual control switch 138. With the device under the control of the push buttons 136, the system is arranged to move the tray corresponding in number to the number of the push button actuated, into an access position, such as shown in Figure 1. The control circuit is preferably arranged so that the desired tray will move into the access position from its previous position along the shortest path thereto. That is, the control system will automatically actuate the motor in whichever direction the selected tray may be most quickly moved into position either counterclockwise or clockwise. With the control system under the control of the manual control switch, the motor may be alternately moved in either direction and stopped with the trays in any desired position.

The invention also contemplates the use of automatic breaking means of a well-known type such as an electromagnetic brake, which is energized upon cessation of the motor, or a current reversing type of brake which applies a current to reverse the direction of the motor for a short period of time until the motor or other parts come to rest. When the control circuit is under the control of the push buttons 136, the trays will be automatically stopped by the brake means when the desired tray is moved into the access position. Under manual control, the brake means is actuated in accordance with the movement of the manual control switch into a position to halt movement of the motor.

In operation, it will be seen that actuation of the motor 114, will through the main drive chain 124 trained about sprockets 118, 120 and 122, drive the outer chains 60 about their spaced sprockets 52 and 54 and the inner chains 74 about their sprockets 66 and 72. Movement of the chains 60 and 74 will carry therewith the arms 82 and 84, 90 and 92. The outer interconnected ends of the arms 90 and 92 pivotally carry the ends of each of the trays 28, and in order to prevent the trays from tilting, swaying or otherwise moving about their pivots, the stabilizing links 100 are rigidly connected therewith, and pivotally connected with the interconnected outer ends of the arms 82 and 84 in spaced relation. Since by the configuration of the linkage, the pivot points about shafts 102 relative to chain 74 are at a constant distance and direction to the pivot points about pins 86 relative to chain 60 and travel in a path that is at all times exactly parallel and uniformly displaced, the motion of the attached trays becomes one of true translation. In this manner, the trays are maintained in constant relation to the horizontal at all times during their movement along their path of travel. Moreover, it will be noted that the inner chains 74 serve to support the trays for movement along their path of travel while the outer chains 60 serve to stabilize the trays to prevent tipping, swinging or pivoting thereof.

It will be noted that as the inner ends of the pairs of arms move around the associated upper or lower sprocket, transverse movement thereof is prevented by virtue of the engagement of the chain on the sprocket. During the straight intermediate runs of the chains, however, the rollers 88 and 98 riding in tracks 40 and 42 will prevent movement of the inner ends of the pairs of arms in a direction transverse to the extent of the chains. In this manner, the trays are effectively held for translational movement along their path of travel, and quiet running operation is insured.

It is also to be noted that as the trays move around the upper and lower sprockets of the curved upper and lower ends of their path of travel, a greater space between adjacent trays is obtained by virtue of the greater distance which the trays must transverse to move around the curved ends. As illustrated in Figure 2, the tray in the upper curved end of the path of travel is disposed a considerable distance away from the adjacent tray in the access position. In this manner, it is possible to amount a considerable number of trays in close proximity within the cabinet and still provide ample space which will enable the operator to gain ready, unobstructed access to the tray being utilized.

Figure 7:
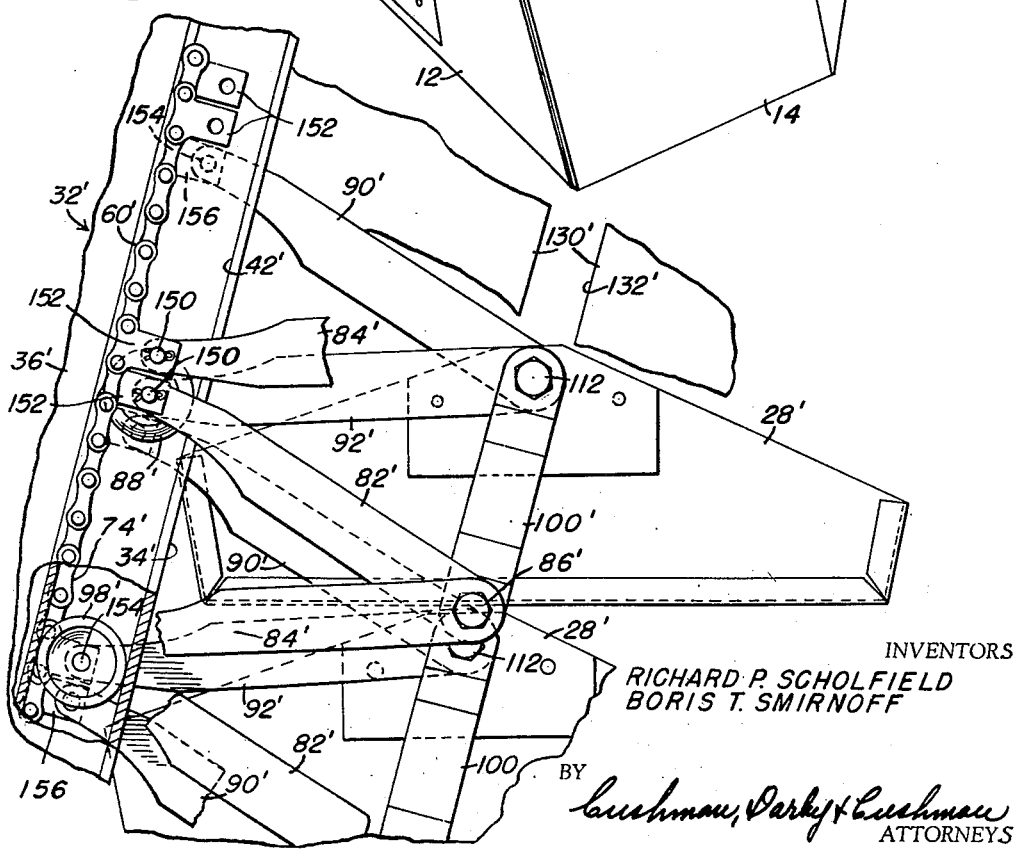
Figure 7 is a view similar to Figure 5 illustrating a modified construction of the present invention.

It will be understood that any desired number of trays may be utilized within the cabinet. In Figure 2, there is illustrated a nine tray cabinet, and in order to secure proper spacing for these trays, the inner ends of the pairs of arms 82 and 84 and 90 and 92 are mounted on the same series of pivot pins. Where a greater or lesser number of trays are utilized, it is, correspondingly, necessary to provide a different spacing of the trays, and hence, for the arms also with the use of the same size chain. For example, in Figure 7, wherein like parts are designated by corresponding primed numerals, there is shown an arrangement for mounting one tray of a fourteen tray apparatus wherein the mounting of the pairs of arms to the chains is somewhat modified. As shown therein, the inner ends of the arms 82' and 84' are mounted on pivot pins 150 carried by adjacent pairs of spaced lugs 152 mounted on the chains 60'. In a like manner, the inner ends of the arms 90' and 92' are pivotally mounted on pivot pins 154 carried by adjacent pairs of spaced lugs 156 on the chains 74'. With this arrangement, it is necessary to mount a roller on only a single pivot pin of each adjacent pair of arms, since one roller will prevent lateral movement of both adjacent arm ends. Of course, where a greater spacing between adjacent lugs is required with variant numbers of trays utilized, it may become necessary to provide a roller at the end of each arm in order to insure against lateral movement thereof.

It will thus be seen that there has been provided by the present invention an apparatus of the type described which is characterized by its quietness in operation, its simplicity of design and ease of operation and maintenance.

It is to be understood that the language used herein is for the purpose of description and not limitation and that the invention may be applied to apparatus other than filing apparatus.

It is also to be understood that the form of the invention herewith shown and described is to be taken as the preferred embodiment of the same and that various changes may be made without departing from the spirit of the invention or the scope of the appended claims.

We claim:

1. In a filing apparatus of the type in which a plurality of trays are mounted for translational movement along a closed substantially upright oblong path having curved upper and lower ends and straight intermediate runs, means for supporting one end of said trays along said path of movement, said means comprising a first endless chain having means providing a first plurality of spaced pivotal axes disposed to move with said first chain in a first path generally conforming in shape to the shape of said tray path, a second endless chain having means providing a second plurality of corresponding spaced pivotal axes disposed to move with said second chain in a second path generally conforming in size and shape to the size and shape of said first path, said first and second paths being laterally offset with respect to each other, each of said chains having a plurality of longitudinally spaced rollers carried thereby, guide track means disposed to receive said rollers so as to prevent lateral movement of said chains during said straight runs, stabilizing means connected between each pair of corresponding pivotal axes, and tray engaging means for fixedly connecting one end of each of said trays to the associated stabilizing means.

2. Apparatus as defined in claim 1 wherein said means providing spaced pivotal axes comprises a plurality of pairs of outwardly extending arms having their inner ends pivotally connected with each chain in spaced relation and their outer ends interconnected to provide said pivotal axes.

3. In a filing apparatus, the combination comprising a cabinet, a plurality of filing trays in said cabinet, and means for supporting said trays for translational movement along a closed oblong path having curved upper and lower ends and straight intermediate runs, said means including a first endless chain adjacent one end of said cabinet, a first series of pairs of outwardly converging arms pivotally connected at their inner ends to said first chain, a second endless chain adjacent said first chain, a second series of pairs of outwardly converging arms pivotally connected at their inner ends to said second chain, means in said cabinet supporting said chains for movement in laterally offset paths having curved upper and lower ends and straight intermediate runs similar to the path of movement of said trays and for substantially preventing lateral movement thereof throughout their paths of movement, a stabilizing link associated with each pair of arms of said first series and a corresponding pair of arms of said second series, means pivotally interconnecting the converging outer ends of each pair of arms of said first series and one end of the associated stabilizing link, and means interconnecting the opposite end of each stabilizing link pivotally with the converging outer ends of the associated pair of arms of said second series and rigidly with the adjacent end of a tray associated therewith.

4. A filing apparatus comprising a cabinet, a plurality of filing trays in said cabinet and means for supporting the trays for translational movement along a closed oblong path having curved upper and lower ends and straight intermediate runs, said means including a vertically disposed support member mounted in one side of said cabinet, said support member having a pair of parallel guide tracks extending from opposite sides thereof, upper and lower sprockets on each side of said support member, the upper sprockets being journalled on spaced axes in said support member adjacent the upper end of said guide tracks, the lower sprockets being journalled on spaced axes in said support member adjacent the lower end of said guide tracks, endless chains trained about the upper and lower sprockets on each side of said support member a plurality of pairs of outwardly extending arms having their inner ends pivotally connected to said chains in spaced relation and their outer ends interconnected, a plurality of rollers connected with each chain adjacent the inner ends of said arms adapted to engage in the guide tracks of the respective side of said support member, a stabilizing link extending between each corresponding pair of interconnected arm ends, and tray engaging means fixedly secured to each of said stabilizing links for fixedly engaging one end of an associated tray.

5. Apparatus as defined in claim 4 wherein said support member comprises a first pair of channels secured together in oppositely facing relation and a second channel narrower than said first pair of channels secured within each first channel and facing in the same direction with the flanges of the channels providing said guide tracks.

References Cited in the file of this patent
UNITED STATES PATENTS

| | | |
|---|---|---|
| 864,438 | Szczys | Aug. 27, 1907 |
| 893,563 | Basler | July 14, 1908 |
| 1,760,448 | Steinschneider | May 27, 1930 |
| 2,125,619 | Parent | Aug. 2, 1938 |
| 2,370,546 | Kiesling | Feb. 27, 1945 |